No. 808,388. PATENTED DEC. 26, 1905.
W. LAHEY.
LUBRICATING JOURNAL BEARINGS.
APPLICATION FILED SEPT. 16, 1903.
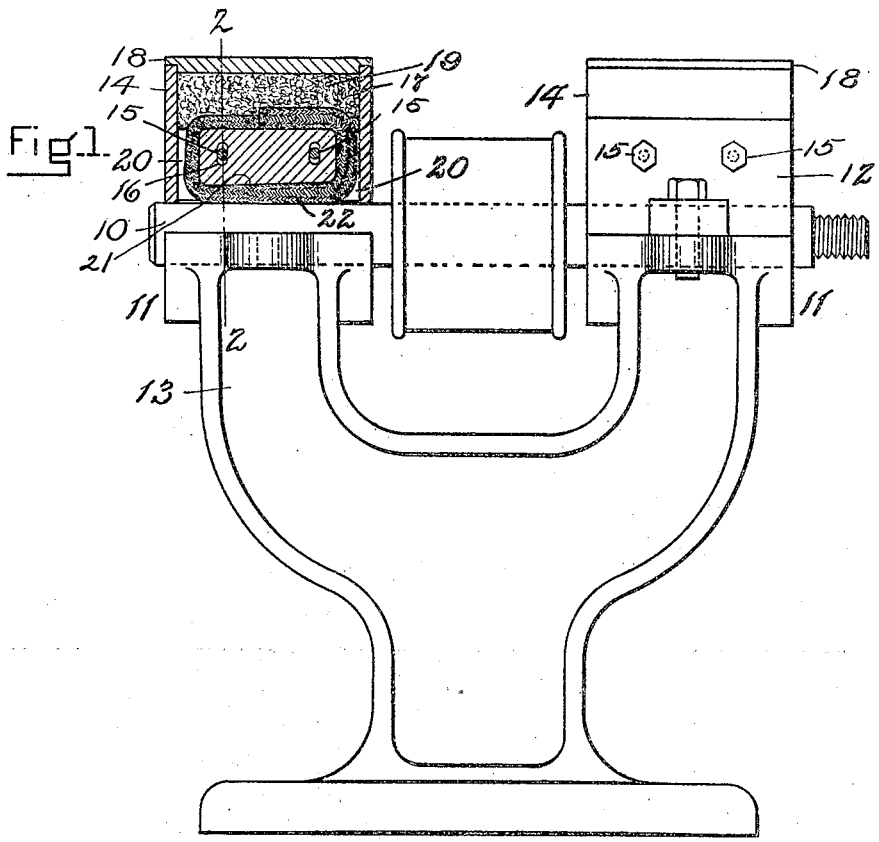
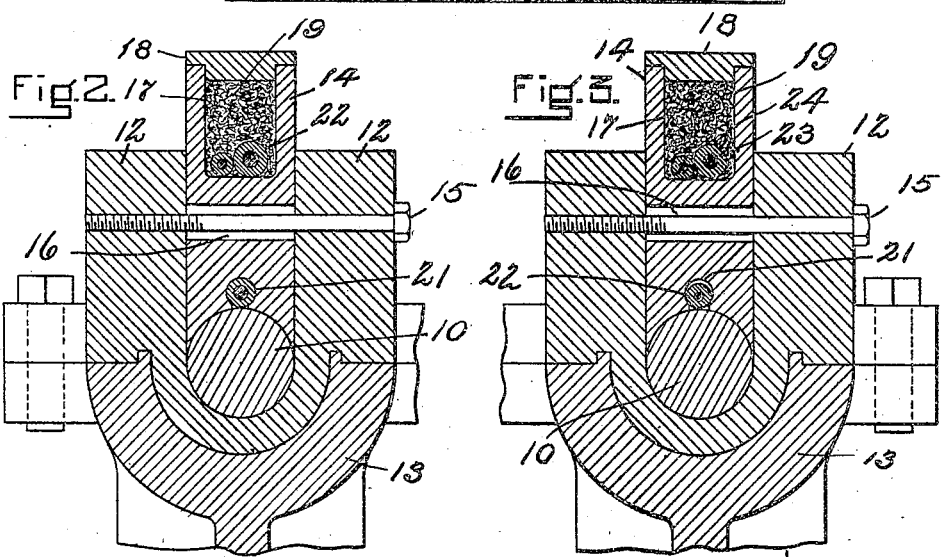
WITNESSES.
Fred. E. Dorr
E. Batchelder
INVENTOR.
Wm Lahey
by Wright Brown & Quinby
Attys

UNITED STATES PATENT OFFICE.

WILLIAM LAHEY, OF LYNN, MASSACHUSETTS.

LUBRICATING JOURNAL-BEARINGS.

No. 808,388.     Specification of Letters Patent.     Patented Dec. 26, 1905.

Application filed September 16, 1903. Serial No. 173,367.

*To all whom it may concern:*

Be it known that I, WILLIAM LAHEY, of Lynn, in the county of Essex and State of Massachusetts, have invented certain new and useful Improvements in Lubricating Journal-Bearings, of which the following is a specification.

This invention relates to means for lubricating a journal or shaft bearing; and the novelty resides in a device or construction for varying the flow of lubricant as desired, such device being embodied in a tapering capillary member adjustable in a channel so as to fill the cross-section of said channel to a greater or less extent, and thus give a variation to the flow of lubricant.

The invention is further embodied in a construction of bearing-block in combination with the above-mentioned feature, as more fully hereinafter described and claimed.

In the accompanying drawings, Figure 1 represents a side elevation of a shaft mounted in journal-bearings constructed according to my invention, one of the bearings being shown in section. Fig. 2 represents a transverse section thereof on the line 2 2 of Fig. 1 on an enlarged scale. Fig. 3 represents a view similar to Fig. 2, showing the capillary device at a different adjustment.

The same reference characters indicate the same parts in all the figures.

In the drawings, 10 is a shaft or journal mounted in bearings 11 11, the construction of one of the bearings being shown in detail in the drawings. Said bearing as illustrated comprises a U-shaped pillow-block 12, supported in a frame or bed-plate 13 and shaped to conform to the lower side of the shaft 10, and an upper bearing-block 14, shaped to conform to the upper side of the shaft and clamped, by means of bolts 15 15, between the arms of the pillow-block 12. The block is formed with vertically-elongated slots 16, occupied by said bolts, whereby said block may be vertically adjusted for wear.

Within the block 14 is formed a chamber 17, having a movable cover 18 and adapted to contain waste or other absorbent material 19, saturated with oil or other liquid lubricant. The chamber 17 communicates at its ends by means of vertical ducts 20 with a horizontal groove 21, parallel with the shaft 10 and opening on the semicylindrical bearing-face of the block 14. The walls of said groove are preferably slightly inclined to the axis of the shaft, as indicated in Fig. 1, thus making the groove taper slightly from the right-hand duct 20 to the left-hand duct 20.

22 is an elongated flexible capillary member made of suitable material, such as wicking, formed into a substantially rectangular loop whose ends occupy the chamber 17, the lower side and two vertical sides of said member occupying, respectively, the groove 21 and the ducts 20. By shifting the capillary member 22 longitudinally of itself it is obvious that said member will fill the cross-section of the groove 21 to a greater or less extent, different adjustments of the capillary member being indicated in Figs. 2 and 3, respectively. When the capillary member entirely fills the groove, the capillary action is somewhat restricted and the flow of lubricant to the shaft 10 diminishes, and, on the contrary, when the capillary member fills the groove to a less extent the flow of lubricant is increased. Thus it becomes possible to vary the flow as desired for obtaining the requisite degree of lubrication of the shaft and also to compensate for differences in the viscosity of the lubricant. By adjusting the block 14 vertically the groove containing the capillary member may be adjusted toward the shaft to compensate for wear and maintain the capillary member in proper proximity to the shaft.

The pillow-block is preferably made of Babbitt metal cast in a single U-shaped piece, including the bearing and arms, as indicated, and the adjustable lubricating-block is preferably made of wood. This arrangement of pillow-block and adjustable lubricating-block materially reduces the expense of construction.

A convenient method of constructing the capillary member 22 is to make it with a tapered core of suitable material, such as leather, with a capillary sheath of wicking or the like, as indicated.

I claim—

1. A lubricating device comprising a capillary member and a block having a grooved face, the groove in said block forming a holding member for the capillary member, one of said members being tapered for the purpose set forth.

2. A shaft-bearing having a tapered channel formed in its surface, and a tapered capillary lubricating member mounted in said channel and adjustable longitudinally thereof.

3. A lubricating shaft-bearing having a tapered groove in its shaft-bearing surface and having a chamber for lubricant, there being ducts connecting said groove and chamber, and a longitudinally-adjustable tapered capillary member in the form of a loop occupying said groove, chamber and ducts.

4. In a shaft-bearing, the combination of a shaft, a bearing-block adjustable toward and from said shaft and formed with a tapered groove adjacent the shaft, and a tapered capillary lubricating member in said groove.

5. In a shaft-bearing, the combination of a shaft, a substantially U-shaped pillow-block therefor, a bearing-block mounted between the arms of said pillow-block and adjustable toward and from the shaft, said bearing-block being formed with a groove adjacent the shaft, a capillary member occupying said groove, and one or more bolts passing through the arms of said pillow-block and through said bearing-block for clamping said block and arms together in different adjustments.

In testimony whereof I have affixed my signature in presence of two witnesses.

WILLIAM LAHEY.

Witnesses:
  A. C. RATIGAN,
  C. F. BROWN.